United States Patent [19]

Duncan

[11] 3,931,795
[45] Jan. 13, 1976

[54] PULSATING TEAT CUPS

[76] Inventor: Lloyd P. Duncan, 814 Rainbow Drive, Washington, Mo. 65802

[22] Filed: July 11, 1974

[21] Appl. No.: 487,781

[52] U.S. Cl............................ 119/14.38; 119/14.49
[51] Int. Cl.².............................................. A01J 5/16
[58] Field of Search............ 119/14.27, 14.31, 14.32, 119/14.36, 14.38, 14.41, 14.47, 14.49, 14.52, 14.01, 14.02

[56] References Cited
UNITED STATES PATENTS

| | | | |
|---|---|---|---|
| 1,089,932 | 3/1914 | Lubke.............................. | 119/14.38 |
| 1,111,978 | 9/1914 | Uebler............................. | 119/14.31 |
| 1,148,706 | 8/1915 | Moore............................. | 119/14.38 |

*Primary Examiner*—Hugh R. Chamblee
*Attorney, Agent, or Firm*—Mason, Mason & Albright

[57] ABSTRACT

A teat cup has a shell and an inner flexible inflation that hermetically seals each end of the shell, preferably leaving an elliptical space between the outer surface of the inflation and the inner surface of the shell. An aperture or opening in the shell communicates air to relieve the vacuum in the space when a valve in the aperture is moved by the collapsing and flattened inflation. The valve can be moved by the inflation located in the space or the valve can be pivoted by the flattened inflation to expose or register with a vacuum source or ambient atmosphere. The inflation is pulsed by a constant source of vacuum connected to an entrance that also leads to the space. The entrance can be valved shut by the inflation and a projection on same that is closely adjacent to the entrance. Also, a pair of inflations have their valved apertures interconnected to one another by a first conduit and a source of constant vacuum in communication with the entrances of the shells connected to one another by a second conduit so that the tandem pulsation of the inflations moves air back and forth through the first conduit.

17 Claims, 22 Drawing Figures

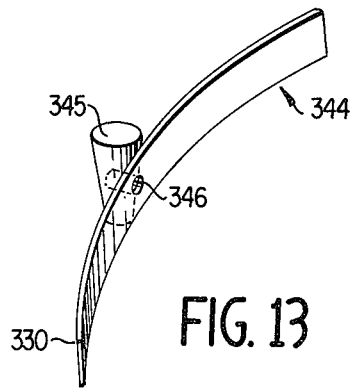
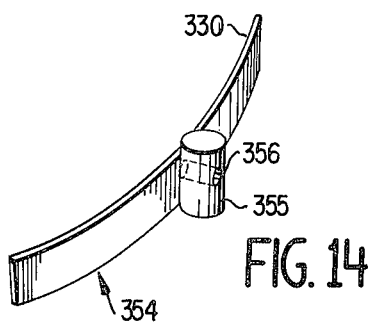
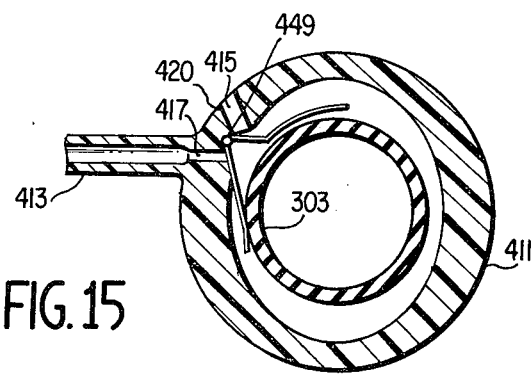
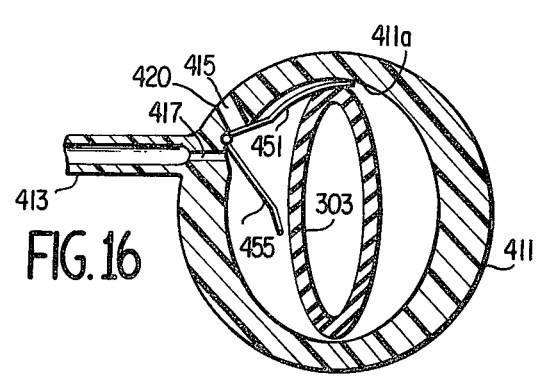
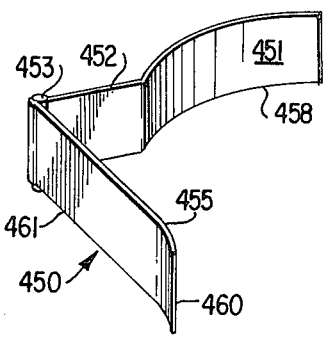
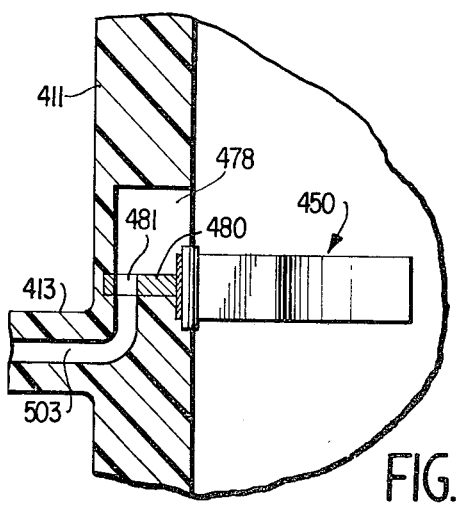
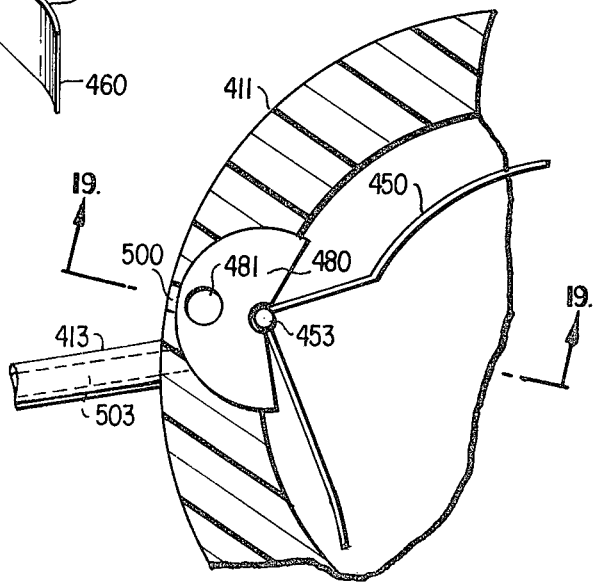

PULSATING TEAT CUPS

This invention relates to "self pulsating" teat cups, or more accurately, teat cups that are connected to a constant source of vacuum and are valved to periodically contract and expand their inflations; i.e. the central portions of the inflations alternately collapse from a generally round shape to a flat condition in which the inflation is expanded in one direction and contracted in another direction.

The usual milking claw systems use pulsators to cycle air withdrawal from the space between a teat cup's outer shell and inner inflation. In general, the pulsators are connected to the teat cups by hoses and remotely located from the teat cups being pulsed so that a large volume of air is moved during each pulse and upon release, the cycle is repeated. Also the conventional systems using pulsators have electrical connectors, wires and pneumatic connections that are subject to malfunction and other disadvantages.

It is an object of the present invention to provide a teat cup system with a valving system that elminiates the conventional pulsator and reduces the many disadvantages of using the same. These and other objects will be apparent from the below description and appended drawings in which:

FIG. 13 is a perspective view of a modified valve member;

FIG. 14 is a perspective view of still another valve member;

FIGS. 15 and 16 are top sectional views of a teat cup with a further modified valve member illustrating expanded and contracted states of the inflation;

FIG. 17 is a perspective view of the valve member shown in FIGS. 15 and 16;

FIG. 18 is a section in part of another teat cup with a still further valve member;

FIG. 19 is a side sectional view of the FIG. 18 teat cup and valve;

Figure 1:
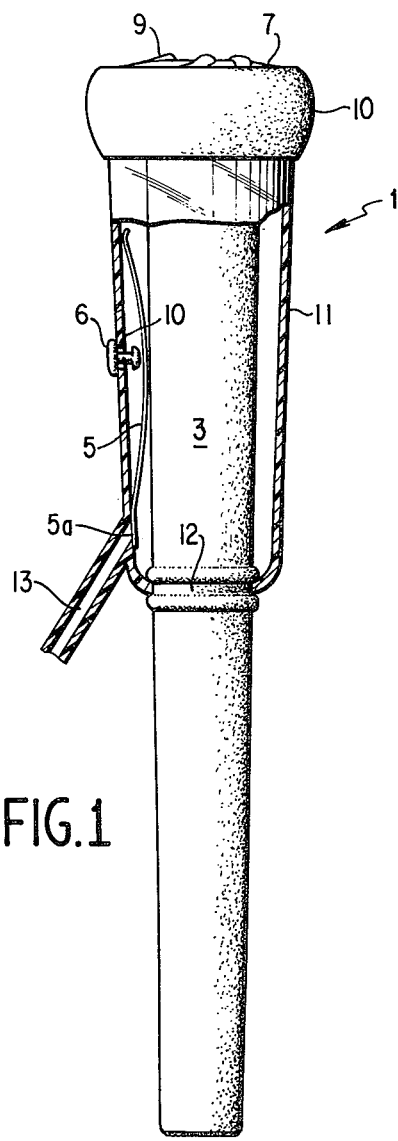
FIG. 1 is an elevation with parts broken away of a teat cup in relaxed condition.
Figure 2:
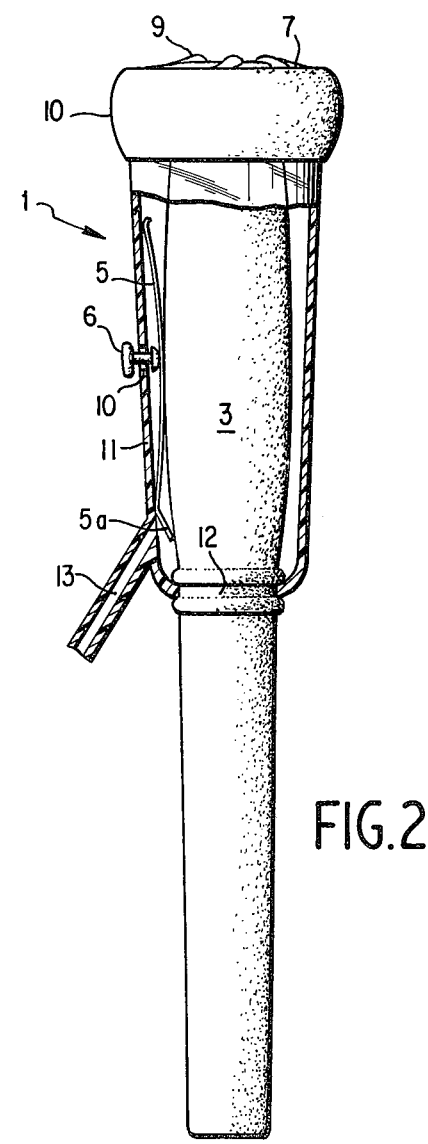
FIG. 2 is an elevation of the FIG. 1 teat cup in expanded condition.
Figure 3:
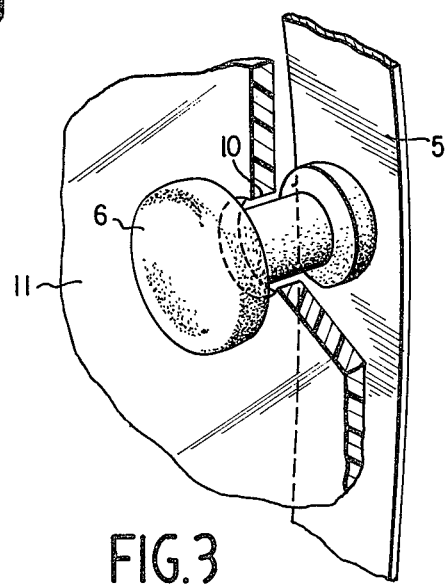
FIG. 3 is an enlarged fragmentary view of the valve in the teat cup shell.

In FIGS. 1 – 3, a teat cup including an outer rigid shell 11 and an inner flexible inflation 3 of resilient rubber or equivalent is shown with the top 7 of the inflation having corrugations 9 and a flap 10 folded over the shell 11 to provide an air tight seal. The bottom portion of the inflation 3 has a groove 12 which accepts the bottom of the shell in another hermetic seal so that applying a vacuum through an entrance such as nipple 13 will cause the inflation 3 to expand within the shell 11.

A resilient leaf spring 5 of spring steel or comparable material is bowed inwardly towards inflation 3 and the lower end 5a of spring 5 is free to operate as a flap and seal the nipple 13 entrance when the spring 5 is in an unbiased condition (FIG. 1). The other end of spring 5 can be adhered to the inner surface of the shell. Valve 6 is fitted so that its stem passes through an aperture 10 through the shell wall. The shell 11 is oblong in section being the same as the FIG. 10 shell in this respect.

In the FIGS. 1 – 3 teat cup, there can be one or two sources of vacuum, but in either case the vacuum source that communicates to the interior of the inflation can be constant and the same or a second source of constant vacuum that communicates through nipple 13 to the space between inflation 3 and shell 11 can also be constant.

In its normal relaxed condition, inflation 3 (FIG. 1 does not bias the spring 5 or valve 6, but once a cow's teat is inserted within the inflation 3 to establish a reduced pressure within the inflation, the latter collapses and flattens (FIG. 2) to push spring 5 and valve 6 outwardly. The spring is snapped or "cricketed" upon substantial total collapse of inflation 3 and the valve 6 vents the interior of the shell 11 to the atmosphere. Also, flap 5a is then snapped open whereupon the inflation 3 is allowed to assume the FIG. 1 condition.

As seen in FIG. 3, the aperture 10 is slightly enlarged to permit the entry of atmospheric air around the stem when valve 6 is urged outwardly by the flattened inflation 3 and spring 5. Thus, air is admitted to equalize the pressure within the space between shell 11 and inflation 3 when the latter is substantially completely flattened by vacuum, whereupon it contacts the bow of spring 5 and pushes same towards the shell's aperture 10. At that time, the end 5a pivots to open the entrance to nipple 13 and the vacuum source. The outer cap of valve 6 seals aperture 10 when the valve is in normal position as shown in FIG. 1.

When the vacuum is applied constantly through nipple 13 and within the inflation 3, in the order of about 10 – 18 inches of mercury, the inflation 3 is periodically contracted and released so that spring end 5a is first closed and valve 6 is briefly pushed outwardly admitting air through aperture 10. Then inflation 3 collapses to open flap 5a whereupon the inflation returns to a generally round configuration, and the vacuum within inflation 3 is unrelieved, allowing spring 5 to assume a bowed position as shown in FIG. 1. The periodic contraction and release of the inflation 3 simulates the function of a pulsator, so that when the teat cup 1 is attached to an animal and vacuum applied to the interior of the inflation, milking takes place.

Figure 4:
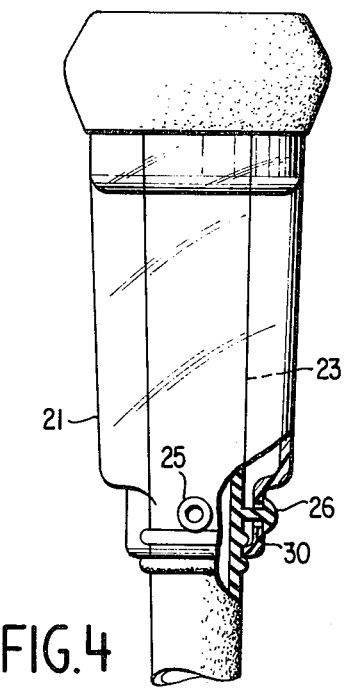
FIG. 4 is a front elevation in part of a modified teat cup.
Figure 5:
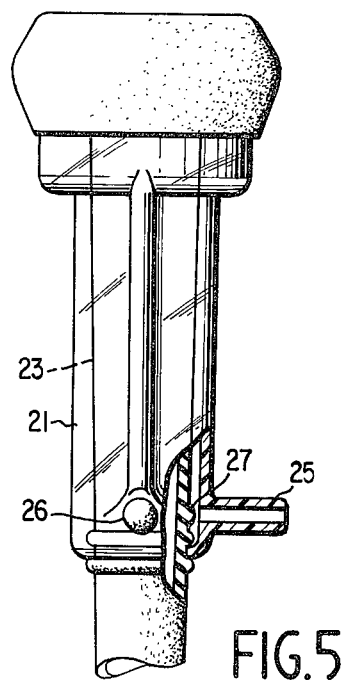
FIG. 5 is a side elevation in part of the FIG. 4 teat cup.

In FIGS. 4 and 5, a modified teat cup is shown in which the entire shell 21 is flattened when viewed from the side (FIG. 5) and the space within the shell elliptical when viewed in section so that, when the inflation 23 is collapsed within the shell 21, the inflation 23 itself flattens to conform to the inner dimensions of shell 21.

The inflation 23 shown in FIGS. 4 and 5 can be similar to that shown in FIGS. 1 – 3 except that the nipple 25 enters the shell 21 opposite a button projection 27 which can be integral with the inflation. When the inflation is being flattened, the projection 27 of inflation 23 need only move a very small distance to unseat and open the entrance of nipple 25 to the vacuum source allowing the resilient inflation to return to a round shape.

Then, a valve 26 having its stem passing through an enlarged aperture 30 and affixed to the inflation, is urged outwardly, upon full collapse of inflation 23. When ambient pressure is admitted by the movement of valve 26 outwardly, air enters the shell through aperture 30 to the space between the shell and inflation until the inflation 23 flattens sufficiently to again expose the entrance of nipple 25, and a vacuum is established within the interior of shell 21. With the inflation 23 thus expanding and contracting, the teat cup is pulsed in the same manner as if accomplished by a pulsator. The vacuum applied to nipple 25, however, is constant and of the order of about 10 – 18 inches of mercury.

The aperture 30 and nipple entrance can be located in a cylindrical lower necked down portion of shell 21 and preferably about 90° removed from one another. Again, it will be appreciated that the reduced pressure within inflation 23 remains unrelieved and contributes to the collapse and flattening of the inflation 23. In the flattened state, the inflation is expanded in one direction but collapsed in another.

Figure 6:
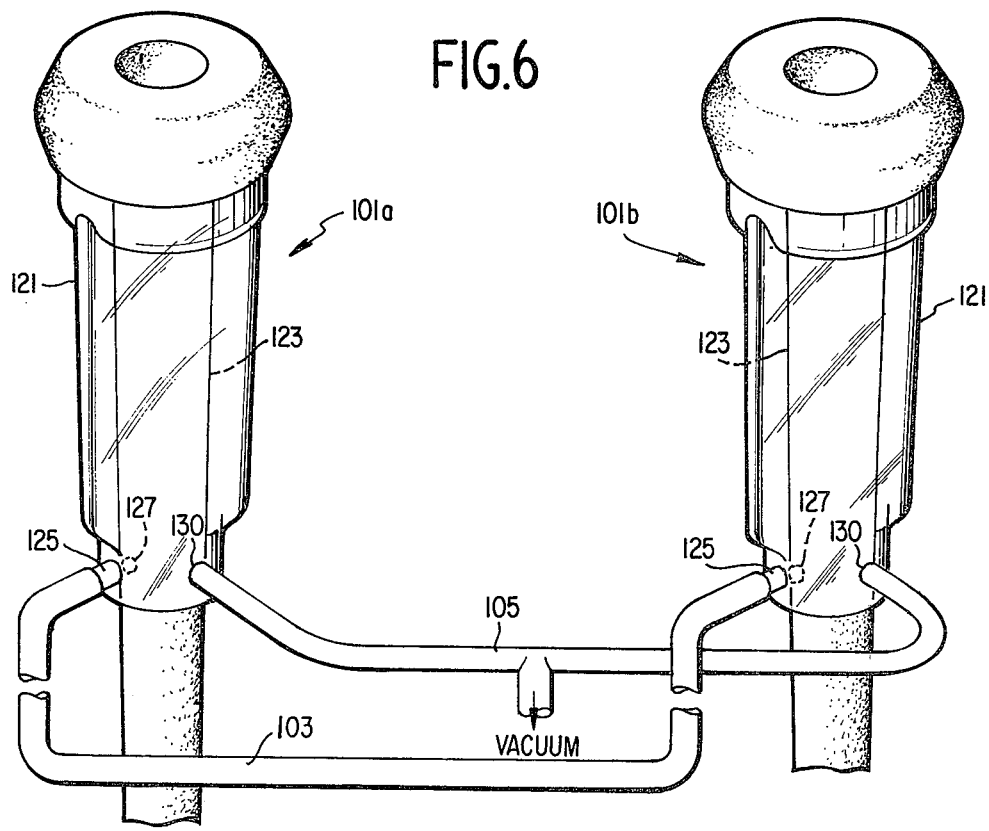
FIG. 6 is a perspective view of a pair of teat cups interconnected to one another.

In FIG. 6, two teat cups 101a and 101b similar to the FIGS. 4 and 5 teat cup are shown connected to one another to alternately cycle and pulse with one inflation 123 contracting while the other inflation 123 expands. The shells 121 are the same as shell 21 of FIGS. 4 and 5 with entrances 130 and nipples 125 having openings that are interconnected via hose conduit 103. However, the entrances 103 are not closed by valves, but directly communicate with one another by a second conduit 105 and to a source of constant vacuum.

Inherently, one inflation will collapse before the other inflation so that if the inflation in the teat cup 101a shown in FIG. 6 collapses first, some air is shunted to the other teat cup 101b via hose 103 until a valve 127 in the form of a button or projection shuts off the opening in nipple 125. The constant vacuum in communication with shells 121 of teat cups 101a and 101b, ensures that the inflations can collapse in tandem. After collapse, the inflation of teat cup 101b expands so that air is shifted back to teat cup 101a. It must be remembered that vacuum is applied to the bores or interiors of each teat cup and that the cow's teats seal the inflations.

The normal leakage that takes place in the teat cups is more than compensated for by the source of constant vacuum and the teat cups 101a and 101b pulse in tandem with one another.

Thus, in one arrangement, a claw with two pairs of such teat cups can have their forward teat cups interconnected to one another and the rear two teat cups connected to pulse in tandem.

Figure 7:
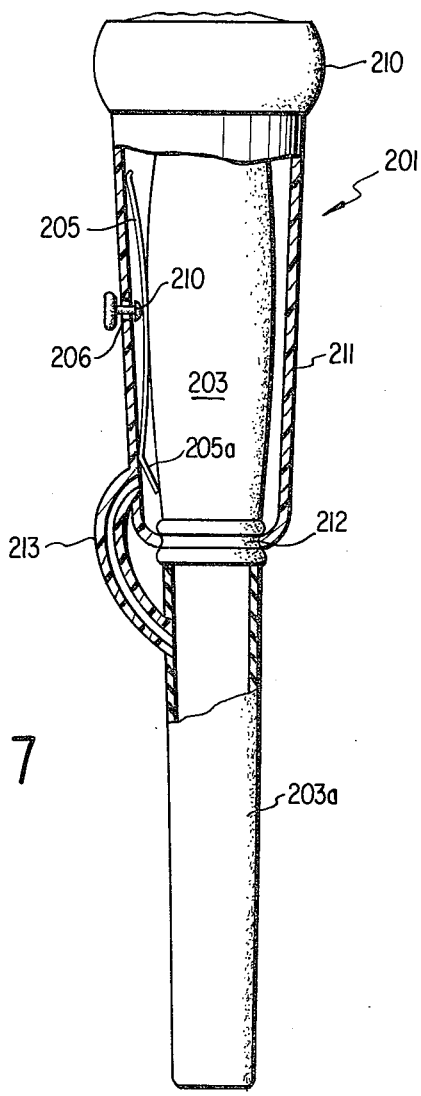
FIG. 7 is an elevation with parts broken away of another teat cup.

In FIG. 7, a teat cup 201 including shell 211 and inner inflation 203 with flap 210 folded over shell 211, has a valve 206 fitted in aperture 210, and the valve 206 biased by a spring 205 in a manner similar to the FIG. 1 – 2 arrangement. Again, the shell 211 has a pulsation nipple 213 and the spring 205 has a lower closure end 205A that periodically closes the entrance of vacuum influence via nipple 213 to the space between shell 211 and inflation 203 when the latter flattens. The teat cup 201 is thus pulsated much the same as teat cup 1 in FIGS. 1 and 2, but instead of the nipple leading as a separate pulsation line to a vacuum source, the nipple 213 is connected in open communication with the lower end of inflation 203 below the groove 212 fitting with shell 211.

The FIG. 7 arrangement results in an improved and simplified system in that milk is quickly flushed from teat cup 201 which cannot flood. Also, the pulsation vacuum cannot be greater than the milking vacuum within the inflation 203 itself. In conventional systems wherein there are separate sources of vacuum to pulsate and to withdraw milk from the teat cup, flooding of the teat cup can temporarily occur. Such flooding occurs unless the milk conduit from the teat cup is large enough to admit displacing air to the cup during the milking of a fast milking cow. Otherwise, leakage around the teat and inflation seal is the means of displacing the milk and allowing same to pass to the receiver and bulk tank.

In FIG. 7, the connection of nipple 213 to the hose portion 203A, the air within nipple 213 allows milk to flush out of the portion 203A. Also, the timing is such that air enters the portion 203A from nipple 213 as the spring valve closure 205A opens so that the air between shell 211 and inflation 203 is evacuated.

Figure 8:
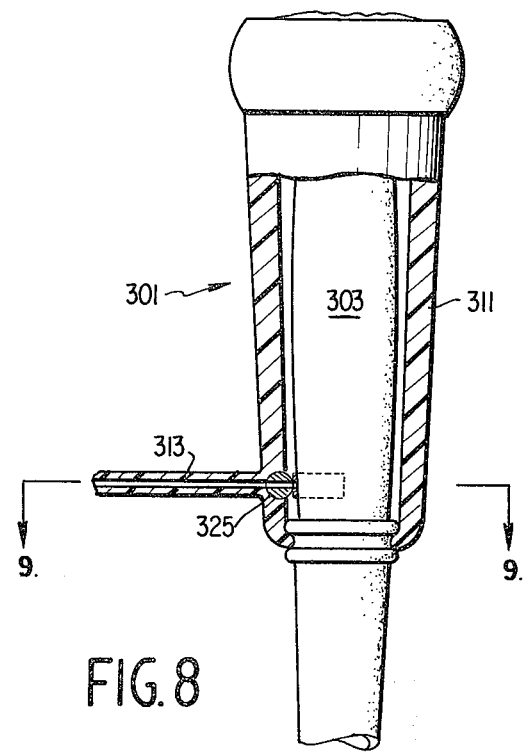
FIG. 8 is an elevation with parts broken away of still another teat cup.

In FIG. 8, a modified teat cup 301 is shown which is similar to the FIG. 1 teat cup but has a thickened shell 311. A nipple 313 leads through the wall of the thickened shell 311 which has an enlarged and generally circular space 320 that houses a turnable ball valve 325 having a passage 326 horizontally oriented. The space between inflation 303 and shell 311 leads to the atmosphere through a duct 315 and to a vacuum source via nipple 313 and entrance 317. The valve 325 is fastened to a semi circular support 330 with arc segments to each side of the valve 325 which segments are bent on a smaller radius than the interior of the shell 311.

Figure 10:
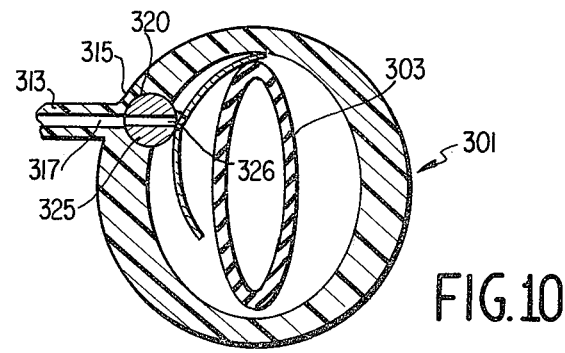
FIG. 10 is a view similar to that of FIG. 9 with the inflation collapsed.
Figure 11:
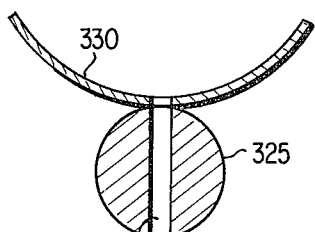
FIG. 11 is an enlarged top section of the valve member shown in FIGS. 8 and 9.
Figure 12:
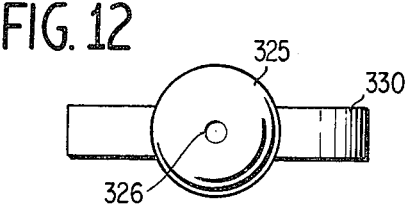
FIG. 12 is a front elevation of the FIG. 11 valve member.

The cross section of the interior of shell 311 is oblong or elliptical as seen in plan view so when the inflation flattens during collapse (FIG. 9) it bears on one segment of support 330 and valve 325 is turned so that passage 325 is moved in register with entrance 317. Upon return to normal shape, inflation 303 urges the other segment of support 330 in the opposite direction to rotate valve 325 and move same to place duct 315 in register with passage 326. The final result is that vacuum via nipple 313 is established and the inflation is released to its full normal shape as seen in FIG. 10. In FIG. 10 the inflation has filled out to lightly bear on each segment of support 330. Thereafter, valve 325 is rotated until passage 326 is turned in register with duct 315 leading to ambient pressure. It will be appreciated that the inflation described herein do not "balloon," but rather collapse and flatten, then return to normal generally round shape upon release.

In FIG. 13, a valve 344 is shown with support 330 similar to that seen in FIGS. 8 – 12 except that the valve body 345 is shaped in the general configuration of a cone having a passage 346 that alternatively registers with entrance 317 and duct 315 the same as ball valve 325. The space corresponding to space 320 in FIG. 10 can be configured to the shape of the cone valve 345. Otherwise, the parts and operation are the same as set forth in connection with FIGS. 8 – 12.

FIG. 14 shows a modified valve 354 having a support 330 and a body 355 in cylinder shape with passage 356. The disclosure given above in connection with FIG. 13 is repeated.

In FIGS. 15 – 19 a modified valve 450 in the general shape of a hinge pin is shown pivoted to the shell 411. The thickened shell 411 is configured much the same as shell 311 except space 320 is omitted, but an entrance 417 leads to nipple 413 normally under a vacuum and a duct 415 communicates with the ambient atmosphere. The valve 450 has arms 451 and 455 connected by pin portion 453. The arm 451 has a straight portion 452 adjacent portion 453 and an outer hook-shaped and 458 that interfits with the inner shell wall 411A opposite the end of the collapsed inflation as seen in FIG. 16. The opposite arm 455 is bent outwardly at its end 460 and has a straight portion 461 near its juncture with hinge portion 453.

In operation, the hinge portion 453 is pivoted and retained within a groove 449 in the inner wall of shell 411, between entrance 417 and duct 415 so that the valve 450 can alternatively open and close same.

Figure 9:
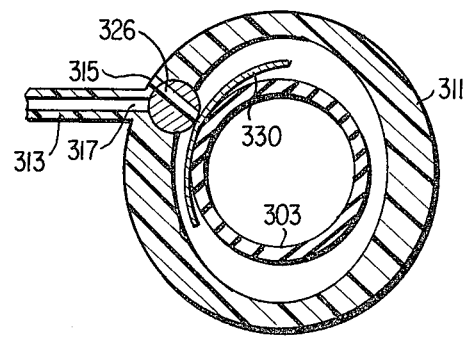
FIG. 9 is a section of the FIG. 8 teat cup taken along the lines of IX — IX.

The operation of the valve 450 is shown in FIGS. 15 and 16 which correspond generally to FIGS. 9 and 10 except that duct 415 is lined with a magnet sleeve 420 that holds the valve 450, the latter preferably being stainless steel.

In FIGS. 18 and 19 a modified hinge pin valve is shown that is the same as the FIGS. 15 – 17 valve except that the hinge portion 453 has a disc 480 with an aperture 481 that is housed within a recess 478 of shell 500. As seen in FIG. 18, the aperture 481 of disc 480 is in communication with atmospheric opening 500.

The inflations of the various teat cups described herein are shown with a conventional fit at the top of their corresponding shells. In copending application Ser. No. 449,009 filed Mar. 7, 1974, a stretch teat cup is disclosed having a spring member fitted at the upper "bell" portion of the inflations. Such spring members can be used in the present invention and when made in oval or oblong configuration, the inflations are encouraged to assume a flattened state by such spring members. Thus, the inflations will invariably collapse and flatten in one direction only.

Figure 20:
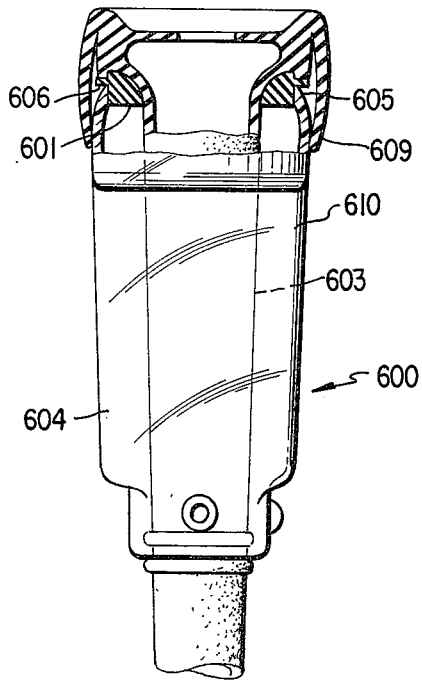
FIG. 20 is a front elevation of a teat cup having an elliptical insert.
Figure 21:
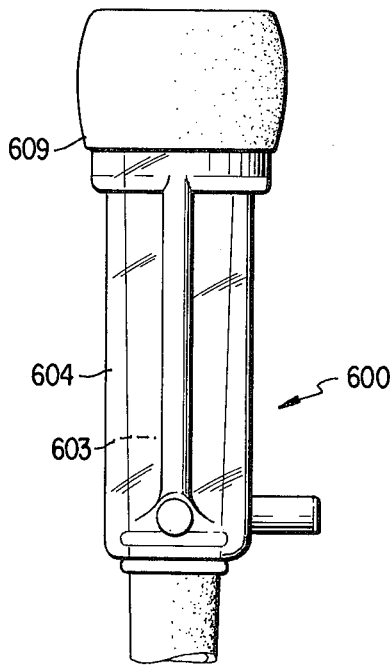
FIG. 21 is a side elevation of the FIG. 20 teat cup.
Figure 22:
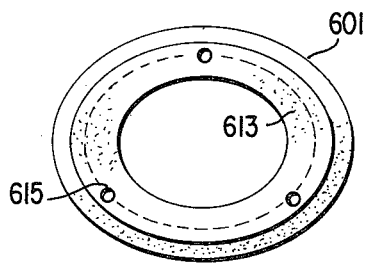
FIG. 22 is a plan view of the insert.

In FIGS. 20 and 21, a teat cup 600 has an elliptical shell 610 and a conventional inflation 603 mounted therein to leave a sealed space 604 within the shell 610. The inflation 603 is essentially the same as that shown in FIGS. 1 – 2 and 4 – 5 with an outer flap 609 that seals the upper part of space 604 when folded down over the shell 610 as shown. The nipple and valve of the FIG. 4 – 5 teat cup is identical to those shown in FIGS. 20 – 21 so that the actual numbers have been omitted.

The upper rim of the shell 610 is elliptical in configuration to receive an insert 601 which is in effect a space ring having a shoulder 606 that rests on the shell rim. The inner perimeter 613 of the insert 601 is rounded to snugly bear on the upper bell portion of inflation 603 and conform the inflation at this point. The interior of the shell is substantially elliptical so that the inflation, upon collapse, expands outwardly in line with the longest axis of the shell 610 and insert 601.

The insert 601 can be made of washable plastic or rubber with through holes 615 to allow drainage when the teat cup 600 is cleaned in place. The insert 601 supports and shapes the bell portion of inflation 603 adjacent the pulsating area.

The inflations in the various embodiments are all flexible or resilient and thus responsive to the degree of vacuum in the space between the shells and inflations. The inflations are also responsive to the reduced pressure within the inflations which, in effect, is initially responsible for the collapse of the inflations during the pulsation cycles.

Numerous modifications have been described, but the scope of the invention is not intended to be limited except as set forth in the claims.

What is claimed is:

1. A teat cup comprising an outer substantially rigid shell of hollow construction and an inner resilient inflation, said inflation extending through said shell and the interior of said inflation being adapted to communicate with a source of reduced pressure, said shell being hermetically sealable at each end with respect to said inflation, said inflation being housed within the shell in spaced apart relationship, entrance means leading through said shell to the space between the shell and said inflation, said entrance means being connectable to a constant source of vacuum to reduce the pressure in said space, an aperture in said shell leading to a source of air and movable valve means within said space being associated with said inflation, said valve means being movable in one direction by the inflation in its flattened and collapsing condition to admit air through the aperture to said space, and said valve means being movable in a second direction to expose said entrance means whereby vacuum is established within said space permitting said inflation to return generally round shape and close said aperture, said valve means being periodically movable to vary the degree of vacuum within said space.

2. A teat cup according to claim 1, wherein said valve means comprises a cap on a stem, said cap being located outside of the shell and said stem extending loosely through said aperture, whereby air passes through the aperture and around the stem when said valve is moved outwardly.

3. A teat cup according to claim 2, wherein a leaf spring is positioned in said space and bowed inwardly to normally bias said inflation to an unexpanded condition.

4. A teat cup according to claim 3, wherein said spring is interposed between the valve and said inflation with at least one end of the spring being free to move, whereby the spring bends outwardly to contact said valve and move same to an unseated condition when said inflation is flattened.

5. A teat cup according to claim 2, wherein the stem of said valve is attached to said inflation.

6. A teat cup according to claim 5, wherein said inflation has a projection opposite and adjacent the entrance of said shell, whereby the entrance and vacuum source is valved shut by the pulsated inflation.

7. A teat cup according to claim 1, wherein a central portion of said shell is generally elliptical in configuration when viewed in cross section.

8. A teat cup according to claim 7, wherein said entrance is located in a lower reduced portion of said shell and about 90° removed from said aperture.

9. A teat cup according to claim 1, wherein said valve means is positioned to open and close said entrance.

10. A teat cup comprising an outer substantially rigid shell of hollow construction and an inner flexible inflation, said inflation extending through said shell and said shell being hermetically sealed at each end by said inflation, a space being defined between the inner surfaces of the shell and the outer surfaces of the inflation, the inner surfaces of said shell being configured to a general elliptical shape, when viewed in plan, and an entrance leading into said space, said entrance being connectable to a source of constant vacuum to reduce the pressure in said space and periodically flatten said inflation to conform to the elliptical shape of the shell, whereby said inflation is pulsed, a valved aperture leading from a source of air through said shell to said space, a movable valve on said cup and said valve being associated with said inflation, said valve being movable by the pulsations of the inflation to open and close said aperture and said space to the entry of air thereby allowing periodic pressure changes within said space.

11. A teat cup according to claim 10, wherein said valve is turnably mounted within said shell and movable by said inflation to open said entrance while closing said aperture and vice versa.

12. A teat cup according to claim 11, wherein said valve has a central turnable portion and a curved arm segment on either side of said central portion.

13. A teat cup according to claim 12, wherein said aperture and said entrance are located on opposite sides of said central portion.

14. A teat cup according to claim 12, wherein said central portion has a passageway that is alternatively placed in register with said entrance and said aperture when said valve is turned.

15. A teat cup according to claim 14, wherein said central portion is a pivoted disc and said shell has a recess to receive said disc, said entrance and said aperture each having a vertical portion that is registrable with said passageway and an integral horizontal portion that is open to ambient pressure.

16. A teat cup according to claim 12, wherein said central portion is a sphere with a passageway that is alternately registrable with said entrance and said aperture.

17. A teat cup comprising an outer substantially rigid shell of hollow construction and an inner resilient inflation, said inflation extending through said shell and the interior of said inflation being adapted to communicate with a source of reduced pressure, said shell being hermetically sealable at each end with respect to said inflation, said inflation being housed within the shell in spaced apart relationship, entrance means leading through said shell to the space between the shell and inflation and said entrance means being directly connected to the interior of a lower portion of said inflation below said shell, a valved aperture in said shell leading to a source of air and means for periodically exposing and closing said aperture to vary the degree of reduced pressure established within said space and pulsate said inflation.

* * * * *